United States Patent
Aljohani et al.

(10) Patent No.: US 11,201,643 B1
(45) Date of Patent: Dec. 14, 2021

(54) METHOD, APPARATUS AND SYSTEM FOR TRANSMISSION OF DATA IN A POWER DOMAIN NON-ORTHOGONAL MULTIPLE ACCESS SYSTEM

(71) Applicant: King Abdulaziz University, Jeddah (SA)

(72) Inventors: Abdulah Jeza Aljohani, Jeddah (SA); Muhammad Moinuddin, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/393,800

(22) Filed: Aug. 4, 2021

(51) Int. Cl.
*H04B 7/0408* (2017.01)
*H04B 7/0426* (2017.01)
*H04B 17/391* (2015.01)

(52) U.S. Cl.
CPC ........... *H04B 7/043* (2013.01); *H04B 7/0408* (2013.01); *H04B 17/3913* (2015.01)

(58) Field of Classification Search
CPC ... H04B 7/043; H04B 17/3913; H04B 7/0408
See application file for complete search history.

(56) References Cited

U.S. PATENT DOCUMENTS

| | | | |
|---|---|---|---|
| 9,225,478 B2 | 12/2015 | Chen et al. | |
| 9,974,081 B2* | 5/2018 | Wang | H04W 72/0473 |
| 2010/0238824 A1 | 9/2010 | Farajidana et al. | |
| 2015/0003338 A1 | 1/2015 | Xue et al. | |
| 2017/0339709 A1* | 11/2017 | Zhang | H04B 7/0671 |
| 2018/0192424 A1* | 7/2018 | Zhang | H04L 27/3444 |
| 2019/0132165 A1* | 5/2019 | Shieh | H04L 1/0003 |
| 2019/0140741 A1* | 5/2019 | Cheng | H04W 72/085 |
| 2019/0306840 A1* | 10/2019 | Taherzadeh Boroujeni | H04W 72/042 |
| 2020/0358638 A1* | 11/2020 | Lin | H04L 27/20 |

(Continued)

FOREIGN PATENT DOCUMENTS

| | | |
|---|---|---|
| CN | 107332614 B | 12/2019 |
| KR | 10-2019-0115817 A | 10/2019 |
| WO | WO 2019/219167 A1 | 11/2019 |

OTHER PUBLICATIONS

Admoon Andrawes, et al., "Energy-Efficient Downlink for Non-Orthogonal Multiple Access with SWIPT under Constrained Throughput", Energies, vol. 13, Issue 107, 2020, pp. 1-19.

*Primary Examiner* — Kenneth T Lam
(74) *Attorney, Agent, or Firm* — Oblon, McClelland, Maier & Neustadt, L.L.P.

(57) ABSTRACT

A method, apparatus, and system of optimizing transmission of data in a power domain non-orthogonal multiple access system is described. The method includes generating a first encoded data stream associated with a first user device, and generating a second encoded data stream associated with a second user device. The method also includes generating a superimposed signal using the first encoded data stream and the second encoded data stream. In addition, the method includes determining a first minimum beam power associated with a first beam vector, and determining a second minimum beam power associated with a second beam vector. The method also includes transmitting the superimposed signal to the first user device at the first minimum beam power, and transmitting the superimposed signal to the second user device at the second minimum beam power.

20 Claims, 9 Drawing Sheets

(56) References Cited

U.S. PATENT DOCUMENTS

2021/0007095 A1   1/2021   Eldessoki et al.
2021/0036818 A1*  2/2021   Eldessoki ........... H04L 27/2604
2021/0036831 A1*  2/2021   Utkovski ............. H04J 11/0026

* cited by examiner

METHOD, APPARATUS AND SYSTEM FOR TRANSMISSION OF DATA IN A POWER DOMAIN NON-ORTHOGONAL MULTIPLE ACCESS SYSTEM

BACKGROUND

Field of the Invention

The present disclosure is related to telecommunication engineering and, more particularly, to a method, apparatus, and system for transmission of data in a power domain non-orthogonal multiple access system.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With advancements in wireless communications, an important aspect for future mobile networks is to be able to serve more users efficiently. Non-orthogonal multiple access (NOMA) constitutes a spectrum-efficient solution that can accommodate large data traffic of the 5G and the next-generation wireless networks. NOMA techniques are integrated with other schemes such as millimeter wave, beamforming, and massive MIMO to provide additional features or capacities. In contrast with the classical orthogonal multiple access (OMA) techniques, such as frequency division multiple access, NOMA has the capability of serving multiple users using the same (time, frequency, code) resource blocks. Capabilities to serve multiple users is attained, in power-domain NOMA, by superimposing users' streams into one signal, while employing the successive interference cancellation (SIC) at receivers. A strong user, also known as a near user, decodes a weak users' signal first and then decodes the signal associated with self. Only a small amount of power is allocated to the strong user to give it a high rate while delivering near-optimal performance to the weak user.

US Patent Publication No. 2015/0003338A1 to Xue et al., titled "Method for efficient channel estimation and beamforming in FDD system by exploiting uplink-downlink correspondence," describes a method for optimizing one or more of the transmitting parameters for downlink data transmission. According to a received uplink channel state information, the rank indicator (RI), precoding matrix indicator (PMI), or modulating and coding scheme (MCS) for downlink data transmission are optimized.

U.S. Pat. No. 9,225,478B2 to Chen et al. titled "Supporting measurements and feedback for 3D MIMO with data transmission optimization," describes a method to estimate a channel state information based on a subset of reference signals alone. A limited number of reference signals is used to optimize beamforming vector; hence, the overall spectral efficiency is disclosed to be improved.

US Patent Publication No. 2010/0238824A1 to Farajidana et al, titled "Feedback mechanisms for beamforming operation", describes a technique for generating feedback data. According to a downlink channel quality from a base station, a mode for the feedback is determined, including a channel quality indicator (CQI) and its rank. Further, the feedback is transmitted to a base station, in order to improve the beamforming operations.

Each of the aforesaid mentioned literature suffers from one or more drawbacks hindering their adoption. Accordingly, it is an object of the present disclosure to alleviate above-mentioned drawbacks with an improved technique for transmission of data in a power domain non-orthogonal multiple access system.

SUMMARY

In an exemplary embodiment, a method of optimizing transmission of data in a power domain non-orthogonal multiple access system is described. The method includes generating a first encoded data stream associated with a first user device in response to a first request from the first user device. The method also includes generating a second encoded data stream associated with a second user device in response to a second request from the second user device. The method further includes superimposing the first encoded data stream and the second encoded data stream to generate a superimposed signal. The method includes estimating a first outage probability value associated with the first user device based on a first signal parameter associated with the first encoded data stream. The first outage probability value satisfies a first acceptable quality of service threshold associated with decoding the first encoded data stream at the first user device. The method also includes estimating a second outage probability value associated with the second user device based on a second signal parameter associated with the second encoded data stream. The second outage probability value satisfies a second acceptable quality of service threshold associated with decoding the second encoded data stream at the second user device. In addition, the method includes determining a first minimum beam power associated with a first beam vector corresponding to the first user device based on the estimated first outage probability value, and determining a second minimum beam power associated with a second beam vector corresponding to the second user device based on the estimated second outage probability value. The method also includes transmitting the superimposed signal to the first user device at the first minimum beam power, and transmitting the superimposed signal to the second user device at the second minimum beam power.

In another exemplary embodiment, an apparatus for optimizing transmission of data in a power domain non-orthogonal multiple access system is described. The apparatus is configured to generate a first encoded data stream associated with a first user device in response to a first request from the first user device and generate a second encoded data stream associated with a second user device in response to a second request from the second user device. In addition, the apparatus is configured to superimpose the first encoded data stream and the second encoded data stream to generate a superimposed signal. The apparatus is also configured to estimate a first outage probability value associated with the first user device based on a first signal parameter associated with the first encoded data stream. The first outage probability value satisfies a first acceptable quality of service threshold associated with decoding the first encoded data stream at the first user device. The apparatus is further configured to estimate a second outage probability value associated with the second user device based on a second signal parameter associated with the second encoded data stream. The second outage probability value satisfies a second acceptable quality of service threshold associated with decoding the second encoded data stream at the second user device. The apparatus is further configured to determine a first minimum beam power associated with a first beam vector corresponding to the first user device based on the estimated first outage probability value and determine a second minimum beam power associated with a second beam vector corresponding to the second user device based on the estimated second outage probability value. The apparatus is further configured to transmit the superimposed signal to the first user device at the first minimum beam power, and transmit the superimposed signal to the second user device at the second minimum beam power.

In another exemplary embodiment, a network management system for optimizing transmission of data in a power domain non-orthogonal multiple access system is described. The network management system includes one or more network nodes, first user devices, or second user devices. Also, the network management system includes a memory, the memory includes programmed instructions stored thereon and one or more processors configured to be capable of executing the stored programmed instructions to generate a first encoded data stream associated with a first user device in response to a first request from the first user device and generate a second encoded data stream associated with a second user device in response to a second request from the second user device. In addition, the one or more processors is configured to superimpose the first encoded data stream and the second encoded data stream to generate a superimposed signal. The one or more processors is configured to estimate a first outage probability value associated with the first user device based on a first signal parameter associated with the first encoded data stream. The first outage probability value satisfies a first acceptable quality of service threshold associated with decoding the first encoded data stream at the first user device. The one or more processors is also configured to estimate a second outage probability value associated with the second user device based on a second signal parameter associated with the second encoded data stream. The second outage probability value satisfies a second acceptable quality of service threshold associated with decoding the second encoded data stream at the second user device. The one or more processors is further configured to determine a first minimum beam power associated with a first beam vector corresponding to the first user device based on the estimated first outage probability value and determine a second minimum beam power associated with a second beam vector corresponding to the second user device based on the estimated second outage probability value. The one or more processors is also configured to transmit the superimposed signal to the first user device at the first minimum beam power, and transmit the superimposed signal to the second user device at the second minimum beam power.

The foregoing general description of the illustrative aspect of the present disclosures and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values there between.

Aspects of the present disclosure are directed to a method, apparatus, and system for optimizing transmission of data in a power domain non-orthogonal multiple access system.

Figure 1:
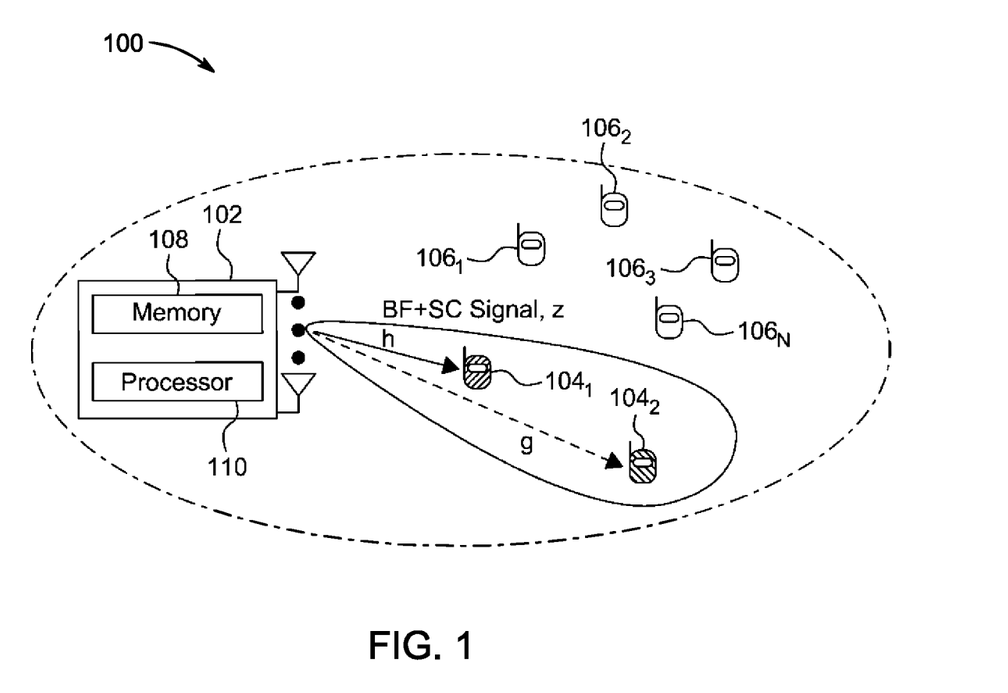
FIG. 1 is a schematic diagram illustrating a downlink beamforming plus superposition code system model transmission, according to an embodiment of the present disclosure.

Referring to FIG. 1, a schematic diagram illustrating downlink beamforming plus superposition code system model transmission, according to one embodiment. FIG. 1 includes a base station 102, a first user device $104_1$, a second user device $104_2$, and user devices $106_1$, $106_2$, $106_3$, and $106_N$. Further, the first user device $104_1$ and the second user device $104_2$ are together referred to as the user devices $104_{1-2}$. The user devices $106_1$, $106_2$, $106_3$, and $106_N$ are together also referred to as user devices $106_{1-N}$. The base station 102 is a transmission and reception station in a fixed location that includes one or more receive/transmit antenna, and/or electronic circuitry configured to handle cellular traffic. In one embodiment, the base station 102 is configured to serve as a bridge between user devices (the user devices $104_{1-2}$ and the user devices $106_{1-N}$), and a mobile switching center (MSC) (not shown). In one example implementation, the base station 102 is an M-element antenna array-aided base station. Other antennas such as a phased array antennas, array patch antenna and microstrip antenna array may be used. The base station 102 may be configured and equipped to support orthogonal multiple access (OMA) techniques and/or non-orthogonal multiple access (NOMA) techniques.

The base station 102 is a node which is a part of a network management system 100 for optimizing transmission of data in a power domain NOMA. The base station 102, inter alia, may include multiple antennas, a memory 108 and processor 110. The memory 108 includes programmed instructions stored to optimize transmission of data in a power domain NOMA. The processor 110 is configured to execute the stored programmed instructions. The first user device $104_1$ and the second user device $104_2$ may be any client device such as a mobile device or a tablet device. In an example implementation, the first user device $104_1$ and the second user device $104_2$ are user devices that utilize NOMA technique. The user devices $106_{1-N}$ are also client devices such as mobile devices. In an example implementation, the user devices $106_{1-N}$ may be devices that utilize NOMA technique or OMA technique.

In operation, the first user device $104_1$, the second user device $104_2$, and the user devices $106_{1-N}$ are communicatively coupled to the base station 102 via a communication link. In one embodiment, the first user device $104_1$ and the second user device $104_2$ are coupled to the base station 102 through NOMA technique. The NOMA technique enables each of the user devices $104_{1-2}$ and user devices $106_{1-N}$ to operate in a same band and at a same time. Further, signals received from the user devices $104_{1-2}$ and user devices $106_{1-N}$ may be distinguished by their power levels. By way of example, the power level received from user devices $104_{1-2}$ may be in the range of 0.5-1.0 watts, preferably 0.75 watts, although other power level ranges may also be included. While the power level received from user devices $106_{1-N}$ may be in the range of 0.5-0.75 watts, preferably 0.6 watts, although other power level ranges may also be included. Since user devices $106_{1-N}$ are further away in distance from user devices $104_{1-2}$ thus the power level of signals received from user devices $106_{1-N}$ undertake path loss (i.e. loss in signal strength as a function of distance), as a result, the received power levels of user devices $106_{1-N}$ is lower than the received power levels of user devices $104_{1-2}$. In one or more embodiments, the base station 102 enabled by the processor 110 uses NOMA technique to apply superposition coding at a transmitter of the base station 102 such that successive interference cancellation (SIC) receiver can separate signals for the user devices $104_{1-2}$ both in an uplink channel and the downlink channel. The NOMA technique is not described here in detail as the technique is well known and described in E. Mahmoud Mohamed: 'Joint users selection and beamforming in downlink millimetre-wave NOMA based on users positioning', IET Commun., 2020, 14, (8), pp. 74-81; and L. Dai, B. Wang, Y. Yuan, S. Han, C. I, Z. Wang.: 'Non-orthogonal multiple access for 5G: solutions, challenges, opportunities, and future research trends', Commun. Mag., 2015, 53, (9), pp. 74-81; and J. Ding, J. Cai, C. Yi.: 'An Improved Coalition Game Approach for MIMO-NOMA Clustering Integrating Beamforming and Power Allocation', Trans. Veh. Technol., 2019, 68, (2), pp. 1672-1687; and J. Choi.: 'On generalized downlink beamforming with NOMA', J. Commun. Networks, 2019, 68, (2), pp. 1672-1687.

The first user device $104_1$ may be at a first distance from the base station 102. The second user device $104_1$ may be at a second distance from the base station 102. In one example, the second distance may be longer than the first distance. As a result, the first user device $104_1$ is also referred to as a near user (NU). The first user device $104_1$ may be at a distance of (h) from the base station 102. The second user device $104_2$ being far from the base station 102 and may also be referred to as a far user (FU). The second user device $104_2$ may be at a distance of (g) from the base station 102. For the purpose of explanation, in an example, the second user device $104_2$ may be as far, for example, to an edge of a cell boundary defined by the base station 102. In an example, the base station 102 may generate a first encoded data stream ($S_{NU}$) associated with the first user device $104_1$ in response to a first request from the first user device $104_1$. The base station 102 may generate a second encoded data stream ($S_{FU}$) associated with the second user device $104_2$ in response to a second request from the second user device $104_2$. The base station 102 may use the NOMA technique to transmit the first encoded data stream $S_{NU}$ and the second encoded data stream $S_{FU}$. According to the NOMA technique, the base station 102 may superimpose the first encoded data stream $S_{NU}$ and the second encoded data stream $S_{FU}$. In an embodiment, the base station 102 may use a superposition coding (SC) technique to perform the superimposition.

Further, the base station 102 transmits the superimposed signal using a beamforming (BF) technique to optimize transmission of data in a power domain NOMA system of the disclosure. The beamforming technique involves the base station 102 transmitting the superimposed signal to the first user device $104_1$ at the first minimum beam power and transmitting the superimposed signal to the second user device $104_2$ at the second minimum beam power. As a result, the base station 102 is configured to serve multiple users simultaneously using the NOMA technique with the disclosed beamforming technique.

The beamforming technique to improve transmission of data in a power domain NOMA system is described henceforth. A base station 102 transmitted signal (BF+SC) is provided by:

$$z = w S_{NU} + v S_{FU} \tag{1}$$

where 'w' and 'v' are the beamforming vectors. Based on understanding of FIG. 1, the received signals of both the NU and the FU are provided, respectively, as:

$$r_{NU} = h^H z + n_{NU} = h(w S_{NU} + v S_{FU}) + n_{NU} \tag{2}$$

$$r_{FU} = g^H z + n_{FU} = (w S_{NU} + v S_{FU}) + n_{FU} \tag{3}$$

where $h^H$ and $g^H$ are an M×1-size channel vectors corresponding with the distance h and distance g, respectively. The M×1-size channel vectors corresponding with the $h^H$ and $g^H$ are frequency-flat block fading channels. Hence, coefficients of both channel vectors may remain same per received antenna during each transmission. Also, '$n_{NU}$' and '$n_{FU}$' are additive white Gaussian noises (AWGN), i.e., $n \sim \mathcal{C} \mathcal{N}(0, \sigma^2)$. In existing NOMA techniques, the beamforming vectors are optimized using full knowledge of instantaneous channels for both near and far users. As a result, more bandwidth and computational complexity are required. The beamforming technique as described in the present disclosure improves the beamforming vector using channel statistics thereby eliminating a requirement of computing or obtaining knowledge of instantaneous channel state information (CSI) based beamforming. Consequently, the optimized beamforming technique of the disclosure optimizes the beamforming vectors with much lesser computational complexity and bandwidth requirements.

Referring back to FIG. 1, $\|h\|^2 \gg \|g\|^2$, thus the near user NU may be able to decode the near user's encoded data stream and the far user's encoded data stream, i.e., $S_{NU}$ and $S_{FU}$. However, the far user FU may be able to decode only a far user's encoded data stream, that is, $S_{FU}$. Base station 102 may allocate lower power to a beam vector of the near user NU than to a beam vector of the far user FU, i.e., $\|v\|^2 \gg \|w\|^2$. Thus, at the near user, SIC is employed to remove the far user's data from the superimposed received signal, z of equation (1). The NU's first encoded data stream $S_{NU}$ is decoded using signal to noise ratio (SNR) (denoted by $\zeta_{NU}$), while the FU's second encoded data stream $S_{FU}$ is decoded using SINR (denoted by $\zeta_{FU}$). Using the equations (2) and (3), the base station 102 may determine $\zeta_{FU}$ and $\zeta_{NU}$ by:

$$\zeta_{FU} = \frac{|h^H v|^2}{|h^H w|^2 + \sigma_{NU}^2}; \zeta_{NU} = \frac{|h^H v|^2}{\sigma_{NU}^2}; \quad (4)$$

At the FU, $S_{NU}$ is considered as interference, however, the power of $S_{NU}$ gets degraded and becomes negligible. Therefore, a signal-to-interference-plus-noise ratio SINR (denoted by $\gamma_{FU}$) for $S_{FU}$ is given by:

$$\gamma_{FU} = \frac{|g^H v|^2}{|g^H w|^2 + \sigma_{FU}^2}; \quad (5)$$

The outage probabilities for $\zeta_{NU}$, $\zeta_{FU}$, and $\gamma_{FU}$ may be used as a quality factor by an operator/user if the outage probabilities are provided as a service metric to be set up. To estimate the outage probabilities, the base station 102 may employ a generic framework that can incorporate the aforementioned SINR/SNRs. A generic variable Y of the generic framework may be defined as follows:

$$Y = \frac{|x^H a|^2}{|x^H b|^2 + \sigma_i^2}; \quad (6)$$

where x is a complex circular Gaussian vector such that $x \sim \mathcal{CN}(0, R_x)$, a and b are beam vectors, and $\sigma_i^2$ is noise variance with subscript i in the set {NU, FU}. The variable Y incorporates all SINR/SNRs defined in the equation (4) and the equation (5) with choice of variables x, a, b, and c (for example, x can be either h or g, a and b vectors can be v or w or a zero vector).

The variable Y can be expressed as a ratio of indefinite quadratic forms as provided by:

$$Y = \frac{\|\tilde{x}\|_A^2}{\|\tilde{x}\|_B^2 + \sigma_i^2}; \quad (7)$$

where $$\tilde{x} = R_x^{\frac{H}{2}} x$$

is a whitened version of x, and the matrices A and B are defined as:

$$A = R_x^{\frac{1}{2}} a a^H R_x^{\frac{H}{2}}; \text{ and } = R_x^{\frac{1}{2}} b b^H R_x^{\frac{H}{2}}. \quad (8)$$

Using the definition of outage probability, the outage probability of Y (denoted by $P_{out}$) for any given threshold value $\gamma_{th}$ can be formulated as:

$$P_{out,Y}(\gamma_{th}) = Pr(Y < \gamma_{th}) = Pr\left(\sigma_i^2 \gamma_{th} + \|\tilde{x}\|_{B\gamma_{th}-A}^2 > 0\right); \quad (9)$$

The solution of the outage probability of equation (9) results in:

$$P_{out,Y}(\gamma_{th}) = 1 - \sum_{m=1}^{M} \frac{\lambda_m^M e^{-\frac{\sigma_i^2 \gamma_{th}}{\lambda_m}}}{\prod_{i=1,i \neq m}^{M}(\lambda_m - \lambda_i)} \frac{1}{|\lambda_m|} u(\lambda_m); \quad (10)$$

where u( ) represents a unit step function, and $\lambda_m$ is the $m^{th}$ eigenvalue of the matrix $A-B\gamma_{th}$.

One of objective of multicast beamforming with SC is to minimize a total power for beam vectors while achieving reliable signal reception. The eigenvalues $\lambda_m$ appearing in the equation (10) are the function of beam vectors v and w. Thus, optimum beam vectors may be designed by minimizing total beam powers while constraining the outage probability at the near user NU and a worst outage probability at the far user FU. To achieve the design of optimum beam vectors by minimizing total beam powers while constraining the outage probability, an optimization problem is formulated as a minimum power multicast beamforming provided by:

$$J_t(w, x, \gamma_{th}) = minimize_{\{w,v\}} \|w\|^2 + \|v\|^2; \quad (11)$$

Subject to $\|v\|^2 \geq \|w\|^2$, $\quad (12)$ $$P_{out,\zeta_{NU}}(\gamma^{th}) \leq P_{\Gamma_N}, \forall \gamma_{th}; \quad (13)$$

$$\max\{P_{out,\zeta_{FU}}(\gamma_{th}), P_{out,\zeta_{FU}}(\gamma_{th})\} \leq P_{\Gamma_F}, \forall \gamma_{th}; \quad (14)$$

A first constraint as provided in (12) is employed to meet the requirement of the power-domain NOMA technique. A second constraint as provided in (13) functions to force the outage of the NU at the near user receiver to be less than the selected maximum acceptable value (denoted by $P_{\Gamma_N}$) which is required to successfully decode the signal $S_{NU}$ after SIC at the NU receiver. Referring back to FIG. 1, the base station 102 may estimate the first outage probability value using the equation (13) associated with the NU based on the first signal parameter (SNR $\zeta_{NU}$) associated with the first encoded data stream. In some embodiments, the value of the maximum acceptable outage is determined by the quality of service (QoS) threshold associated with decoding the first encoded data stream at the first user device $104_1$. A third constraint as provided in (14) is utilized to limit a worst-case outage of the FU to be less than certain a maximum acceptable value (denoted by $P_{\Gamma_F}$) which makes sure that the signal $S_{FU}$ can be successfully decoded at both the NU and FU. The base station 102 may estimate the second outage probability value using the equation (14) associated with the FU device based on a second signal parameter (SINR $\zeta_{FU}$) associated with the second encoded data stream. In some embodiments, the value of the maximum acceptable outage is determined by the QoS threshold associated with decoding the second encoded data stream at the second user device $104_2$.

The objective function of the equation (11) is a non-convex function of beam vectors whose unique solutions are to be determined. Thus, numerical optimization methods such as active set (AS) optimization and sequential quadratic programming (SQP) are employed to solve the above optimization problem. An example, optimization method based on AS optimization and SQP is provided in Table 1.

TABLE 1

NOMA - Beamforming Optimization method

| | |
|---|---|
| 1: | Set optimization algorithm to AS or SQP |
| 2: | Set precise level (e), and maximum iteration count T |
| 3: | Initialize w and v with random orthonormal vectors |
| 4: | Time Index t = 0 |
| 5: | Compute $J_t$ (w, v, $\gamma_{th}$) using the equation (11) |
| 6: | repeat |
| 7: | t = t + 1 |
| 8: | Find $J_t$ (w, v, $\gamma_{th}$) |
| 9: | if $|J_t$ (w, v, $\gamma_{th}) - J_{t-1}$ (w, v, $\gamma_{th})| \geq$ e then |
| 10: | update w = $w^{opt}$, v = $v^{opt}$ |
| 11: | else |
| 12: | condition = true |
| 13: | until condition = true, or t > T |

As understood from equations (11) and constraints (12), (13), and (14), the optimized beamforming technique of the disclosure applies constraints on the outage probabilities which uses statistics of the channel. The optimized beamforming technique to optimize transmission of data in a power domain NOMA system of the disclosure may find optimum beam vectors by utilizing the statistics of the channel. The technique of obtaining statistics of the channel is not explained herein for the sake of brevity. Also, obtaining statistics of the channel does not involve a lot of computation complexity and does not require a lot of bandwidth. Thus, the optimized beamforming technique of the disclosure requires much lesser computational complexity and bandwidth requirements in contrast to known techniques that uses a knowledge of instantaneous channel state information (CSI) based beamforming. The instantaneous channel state information based technique requires more bandwidth due to pilot transmission for channel estimation. Furthermore, the channel estimation process as in the instantaneous channel state information based technique involves computational cost.

Referring back to FIG. 1, the base station 102 may use the optimized beamforming technique as described in the equations (11), constraints (12), (13) and (14) and optimization method based on AS optimization and SQP, to determine a first minimum beam power associated with a first beam vector corresponding to the near user NU based on the estimated first outage probability value. Similarly, the base station 102 may determine a second minimum beam power associated with a second beam vector corresponding to the second user device based on the estimated second outage probability value. The base station 102 may transmit the superimposed signal to the first user device at the first minimum beam power. Further, the base station 102 may transmit the superimposed signal to the second user device at the second minimum beam power.

On receiving the superimposed signal from the base station 102, the first user device $104_1$ decodes the first encoded data stream. Similarly, the second user device $104_2$ decodes the first second encoded data stream from the superimposed signal. In one or more embodiments, the receiver at the first user device $104_1$ and the second user device $104_2$ use SIC to decode the superimposed signal until the first user device $104_1$ and the second user device $104_2$ find their desired signal. The concept of decoding using SIC is well known and is not explained for brevity. Furthermore, though the first user device $104_1$ is referred to as the near user NU and the second user device $104_2$ is referred to as the far user FU, in one or more embodiments, the second user device $104_2$ can become a near user NU and the first user device $104_1$ can become a far user FU due to mobility, and the optimized beamforming technique as described is still applicable as described. Although only two devices and two encoded data streams are disclosed for explanation, one can appreciate that the optimized beamforming technique to optimize transmission of data in a power domain NOMA system of the disclosure can be configured to process more than two encoded data streams. Thus, the usage of the optimization method, system and apparatus of the disclosure optimizes transmission of data in a power domain NOMA by transmitting two or more encoded data streams.

Figure 2:
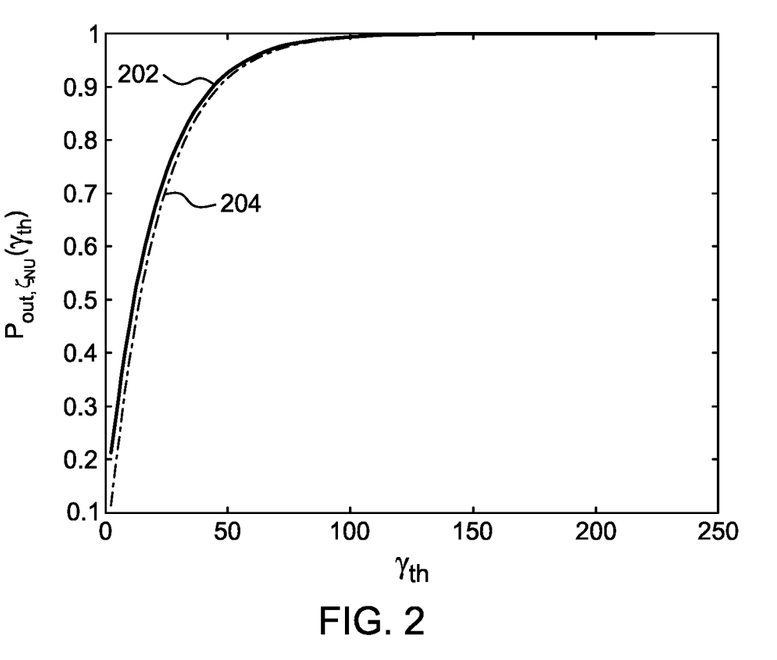
FIG. 2 illustrates results of validation of analytical outage probability $P_{out}$, $\zeta_{NU}(\gamma_{th})$, according to an embodiment of the present disclosure.

Experimental Results:

Results of usage of the optimization method, system and apparatus of the disclosure is described in the section. In one example, a length of beam vectors is set to M=5, and an additive noise variance is set such that the SNR is kept at 20 dB. Channel vectors are generated as complex zero mean circular Gaussian random vectors with correlation matrix with exponential correlation coefficients, i.e., $R_x^{i,j}=\rho^{|i-j|}$ (the correlation coefficient ρ lies in [0,1]). To implement power domain NOMA, a beam vector is set as:

$$v=\sqrt{P_v}v; \text{ and } =\sqrt{P_w}w; \qquad (15)$$

where $\|v\|^2=\|w\|^2=1$. The SC power assigned to near and far users are 0.2 and 0.8, respectively (i.e., $P_v$=0.8 and $P_w$=0.2), where the summation of two powers are normalized for comparison. In an example, a derived analytical expression of outage probability for $\zeta_{NU}$ is validated in FIG. 2 by comparing with a Monte-Carlo simulation result 202 of the outage probability for $\zeta_{NU}$ against outage probability for $\zeta_{NU}$ potting via analytical expression 204 using the equation (10) with eigenvalues calculated from the matrix $R_h^{1/2}ww^H R_h^{H/2}$ and setting $\sigma_i^2=\sigma_{NU}^2$. The plots obtained based on the analytical expression 204 of the equation (10) and the Monte-Carlo simulation result 202 of the outage probability for $\zeta_{NU}$ depicts a close match between the simulation 202 and the derived analytical expression 202.

Figure 3:
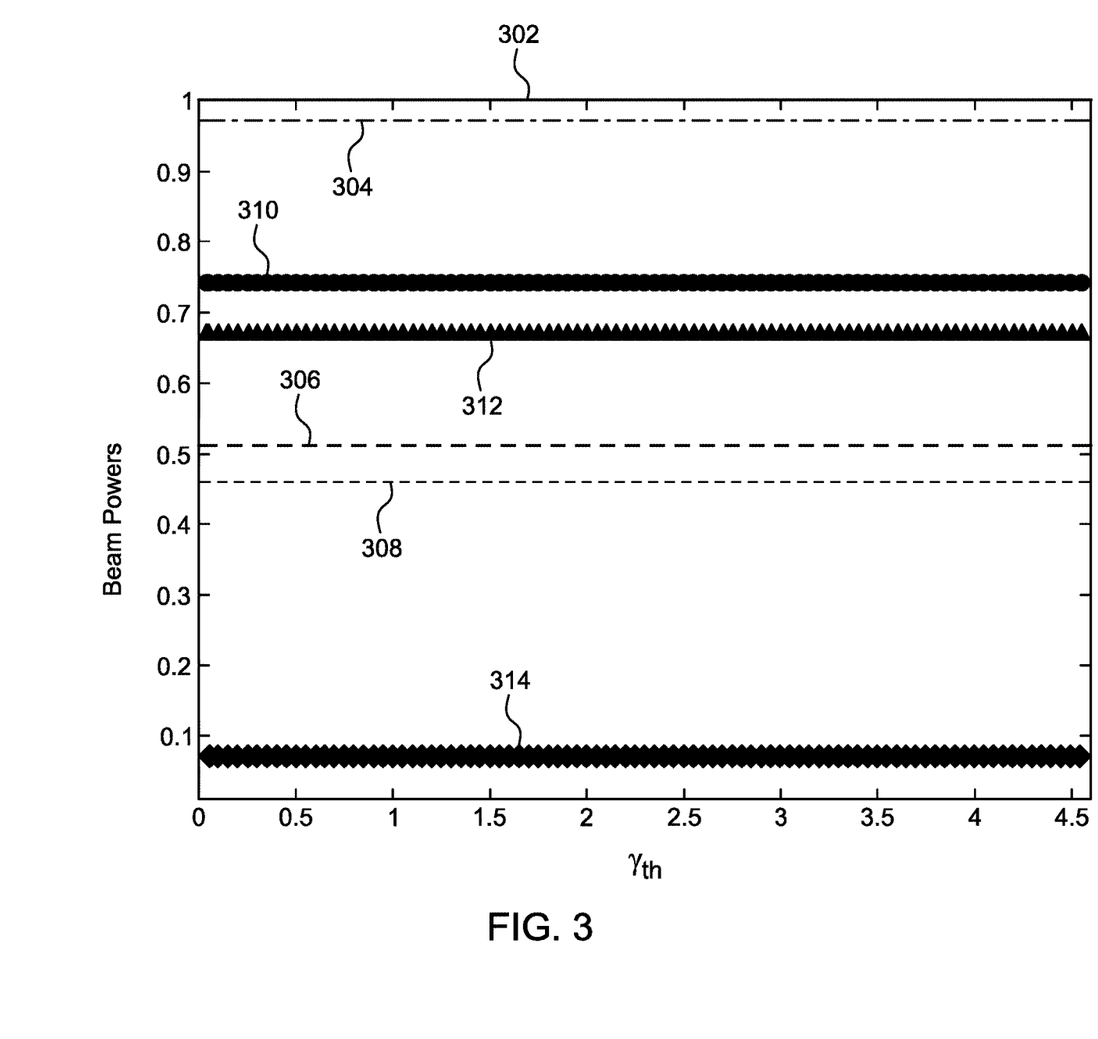
FIG. 3 illustrates optimization performance for beam powers for two different lengths of antenna array, according to an embodiment of the present disclosure.
Figure 4:
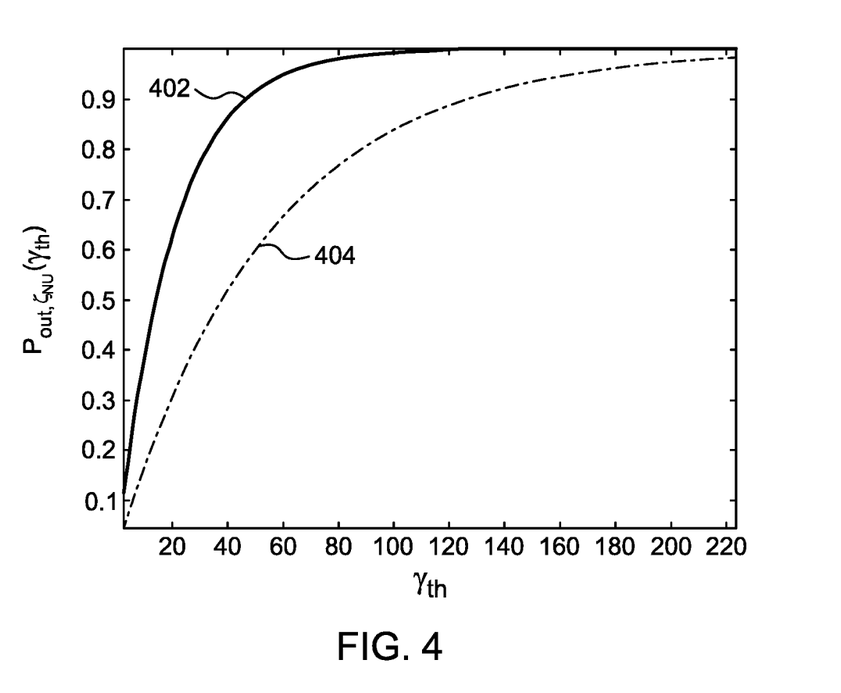
FIG. 4 illustrates a performance of outage probability constraint for a near user is compared before and after optimization, according to an embodiment of the present disclosure.

FIG. 3 illustrates an performance for beam powers $\|v\|^2$, $\|w\|^2$, and $\|v\|^2+\|w\|^2$ for two different lengths of antenna array, that is, L=5 and L=8, according to one example embodiment. FIG. 3 illustrates plots of $\|v\|^2+\|w\|^2$ without optimization 302, $\|v\|^2+\|w\|^2$ after optimization for L=5 (304 of FIG. 3), $\|v\|^2$ after optimization for L=5 (306 of FIG. 3), $\|w\|^2$ after optimization for L=5 (308 of FIG. 3), $\|v\|^2+\|w\|^2$ after optimization for L=8 (310 of FIG. 3), $\|v\|^2$ after optimization for L=8 (312 of FIG. 3), and $\|w\|^2$ after optimization for L=8 (314 of FIG. 3). FIG. 3 demonstrates that a total beam power is minimized in both scenarios (that is 304, and 310) while the constraint on individual powers, that is, $\|v\|^2 \geq \|w\|^2$ is satisfied. Furthermore, the plots in FIG. 3 illustrates that power minimization is more for L=8 in contrast to L=5 demonstrating a benefit of using larger antenna array. Further, FIG. 4 illustrates a performance of the outage probability constraint for $\zeta_{NU}$ is investigated for L=8. Plots depicting performance of an outage probability without optimization 402, and an outage probability constraint with power optimization 404 demonstrates reduction in outage probability thereby satisfying the constraints successfully.

Figure 5:
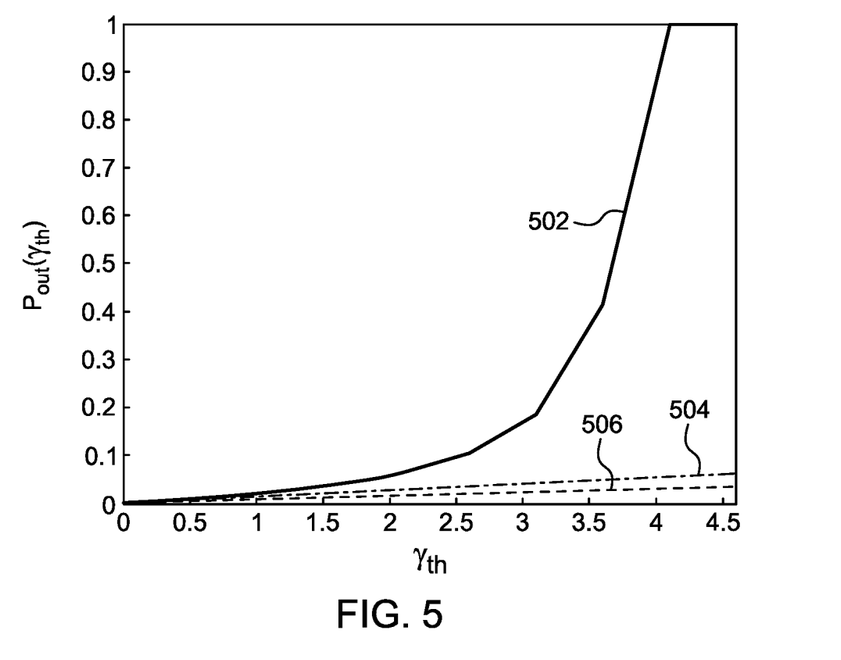
FIG. 5 illustrates a performance of outage probability constraint for a far user is compared before and after optimization, according to an embodiment of the present disclosure.

FIG. 5 illustrates a performance of outage probability constraint for the far user FU, according to one embodiment. FIG. 5 illustrates a plot indicative of outage probability for the far user without optimization 502, a plot indicative of outage probability constraint for the far user FU after optimization 504 and a plot indicative of outage probability constraint for the far user FU after optimization 506. The plots 504 and 506 depict that a worst outage probability of far user is never exceeding a limit and plot of the outage probability without optimization 502 thereby successfully meeting the desired constraint. From FIG. 5, it is apparent that the optimized beamforming method, system, and apparatus of the disclosure not only satisfies the constraints, but also minimizes the outage probability with respect to the outage probability constraint. Based on the experimental results, it is understood that overall performance of the optimized beamforming method, system and apparatus achieve both lower transmission power as well as lower outage probabilities for both near and far users, that ensures reliable QoS service. Furthermore, the optimized beamforming method, system, and apparatus are bandwidth efficient due to the lack of any requirement to send pilot signals for channel estimation.

Advantages:

1. Efficiency: The method, system and apparatus of the disclosure enhances the efficiency of spectrum usage, where within the same frequency band two or more users can be supported. In 5G NR preferred frequency bands include C and FR2 (e.g., 4-8 GHz and 24.25 GHz to 52.6 GHz, respectively).

2. Bandwidth efficient: The method, system and apparatus of the disclosure provide bandwidth efficiency due to usage of the channel statistics rather than the estimation of instantaneous CSI. Dealing with the instantaneous CSI requires more bandwidth and computational complexity as instantaneous channel state information (CSI) requires transmission of pilot signals while channel statistics does not require transmission of pilot signals for channel estimation.

3. QoS: The method, system, and apparatus of the disclosure provides a reliable QoS service based on determined low outage probabilities for the near users and the far and with no CSI feedback, thus providing maximum throughput.

4. 5G candidature: The optimization method, system and apparatus of the disclosure may be considered as a strong candidate for a spectral efficient 5G communication.

Figure 6:
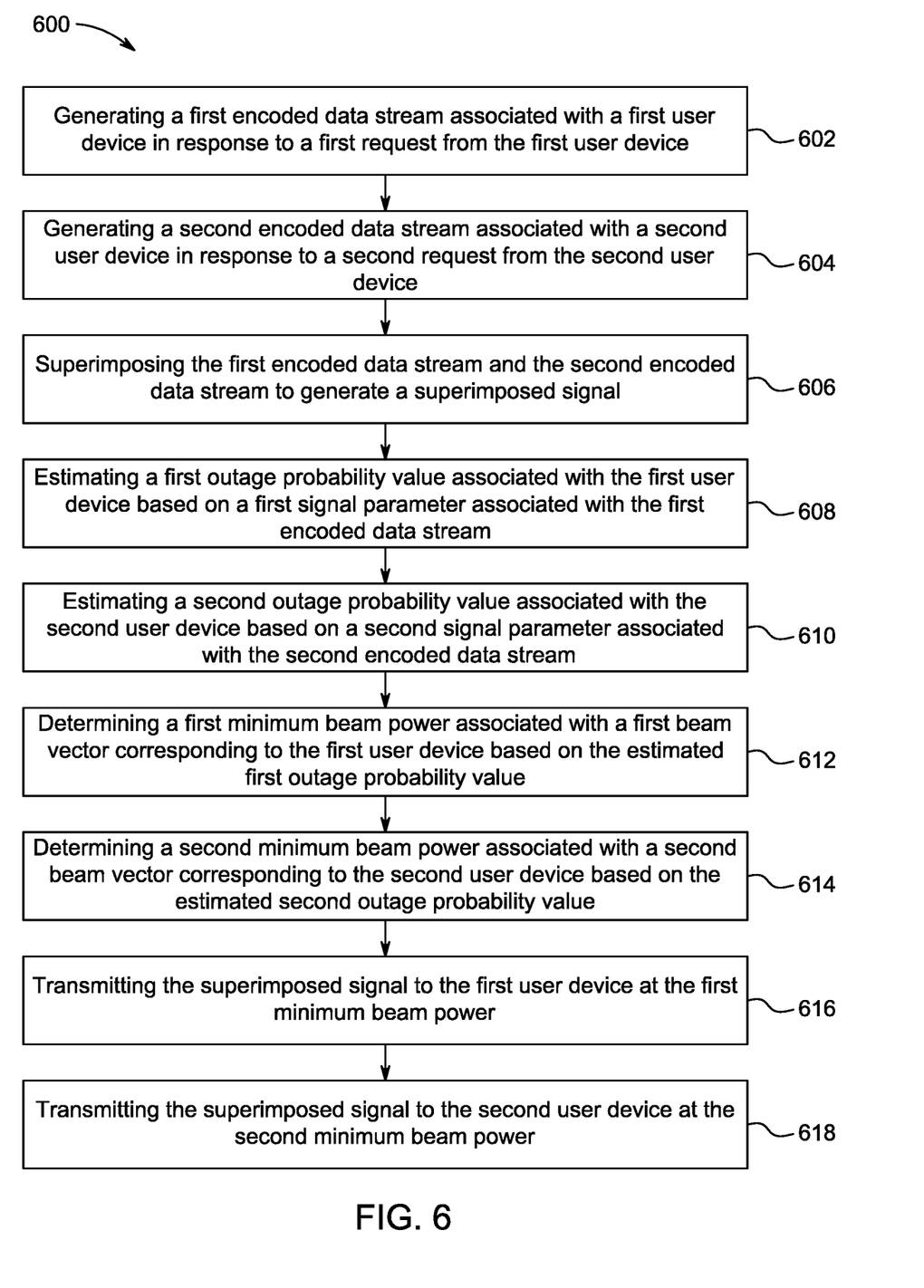
FIG. 6 illustrates a process flow for optimizing transmission of data in a power domain non-orthogonal multiple access system, according to an embodiment of the present disclosure.

FIG. 6 illustrates a process flow for optimizing transmission of data in a power domain NOMA system. The process flow involves the base station 102, the first user device $104_1$, and the second user device $104_2$. The first user device $104_1$ is at a first distance from the base station 102 and the second user device $104_2$ is at a second distance from the base station 102. The second distance is longer than the first distance. Thus, the first user device $104_1$ is also referred to as the near user NU and at a distance of h from the base station 102. The second user device $104_2$ being far from the base station 102 at the distance g is referred to as the far user FU. Although, the first user device $104_1$ is also referred to as the near user NU and the second user device $104_2$ is referred to as the far user FU, the positions of the first user device $104_1$ and the positions of the second user device $104_2$ may interchange causing the first user device $104_1$ to become the far user FU and the second user device $104_2$ to become the near user NU. For the purposes of the process flow, the first user device $104_1$ is also referred to as the near user NU and the second user device $104_2$ is referred to as the far user FU.

Step 602 includes generating a first encoded data stream $S_{NU}$ associated with the first user device $104_1$ in response to a first request from the first user device $104_1$. Step 604 includes generating a second encoded data stream $S_{FU}$ associated with the second user device $104_2$ in response to a second request from the second user device $104_2$. In one or more embodiments, a NOMA technique is used to manage the first encoded data stream $S_{NU}$ and the second encoded data stream $S_{FU}$. Step 606 includes superimposing the first encoded data stream $S_{NU}$ and the second encoded data stream $S_{FU}$ to generate a superimposed signal z. In an embodiment, a superposition coding (SC) technique may be used to perform the superimposition based on NOMA technique. Step 608 includes estimating a first outage probability value associated with the first user device $104_1$ based on a first signal parameter associated with the first encoded data stream $S_{NU}$. In one or more embodiments, the first signal parameter is a SNR ($\zeta_{NU}$) associated with the first encoded data stream $S_{NU}$. The first outage probability value satisfies a first acceptable quality of service threshold associated with decoding the first encoded data stream $S_{NU}$ at the first user device $104_1$. In an embodiment, the first encoded data stream $S_{NU}$ at the first user device $104_1$ is decoded using SNR ($\zeta_{NU}$) due to $\|h\|^2 \gg \|g\|^2$ and also due allocation of lower power by the base station 102 to a beam vector of the first user device $104_1$ than to a beam vector of the second user device $104_2$, i.e., $\|v\|^2 \gg \|w\|^2$. Step 610 includes estimating a second outage probability value associated with the second user device $104_2$ based on a second signal parameter associated with the second encoded data stream $S_{FU}$. The second signal parameter is a SINR ($\zeta_{FU}$) associated with the second encoded data stream $S_{FU}$. In an embodiment, the second encoded data stream $S_{FU}$ at the second user device $104_2$ is decoded using SINR ($\zeta_{FU}$). The second outage probability value satisfies a second acceptable quality of service threshold associated with decoding the second encoded data stream $S_{FU}$ at the second user device $104_2$. At the second user device $104_2$, $S_{NU}$ is considered as interference, however, the power of $S_{NU}$ gets degraded and becomes negligible. Thus SINR ($\zeta_{FU}$) is used for decoding the second encoded data stream $S_{FU}$ at the second user device $104_2$. Step 612 includes determining a first minimum beam power associated with a first beam vector corresponding to the first user device $104_1$ based on the estimated first outage probability value. Step 614 includes determining a second minimum beam power associated with a second beam vector corresponding to the second user device $104_2$ based on the estimated second outage probability value.

In one or more embodiments, optimum beam vectors may be designed by minimizing total beam powers while constraining the outage probability at the first user device $104_1$ and a worst outage probability at the second user device $104_2$. To achieve the design of optimum beam vectors by minimizing total beam powers while constraining the outage probability, an optimization problem is formulated as a minimum power multicast beamforming as described in the equations (11)-(14). Step 616 includes transmitting the superimposed signal to the first user device $104_1$ at the first minimum beam power. The first encoded data stream $S_{NU}$ in the superimposed signal is configured to be decoded by the first user device $104_1$. Step 618 includes transmitting the superimposed signal to the second user device $104_2$ at the second minimum beam power. The second encoded data stream $S_{FU}$ in the superimposed signal is configured to be decoded by the second user device $104_2$. In one or more embodiments, the base station 102 which is a node of the network management system for optimizing transmission of data in a power domain NOMA, performs the steps of generating the first encoded data stream $S_{NU}$ and the second encoded data stream $S_{FU}$, generating the superimposed signal of the first encoded data stream $S_{NU}$ and the second encoded data stream $S_{FU}$, estimating the first outage probability value, estimating the second outage probability value, determining the first minimum beam power, determining the second minimum beam power, and transmitting the superimposed signal. As a result, the base station 102 is configured to serve multiple users simultaneously using the NOMA technique with the disclosed optimized beamforming technique.

Figure 7:
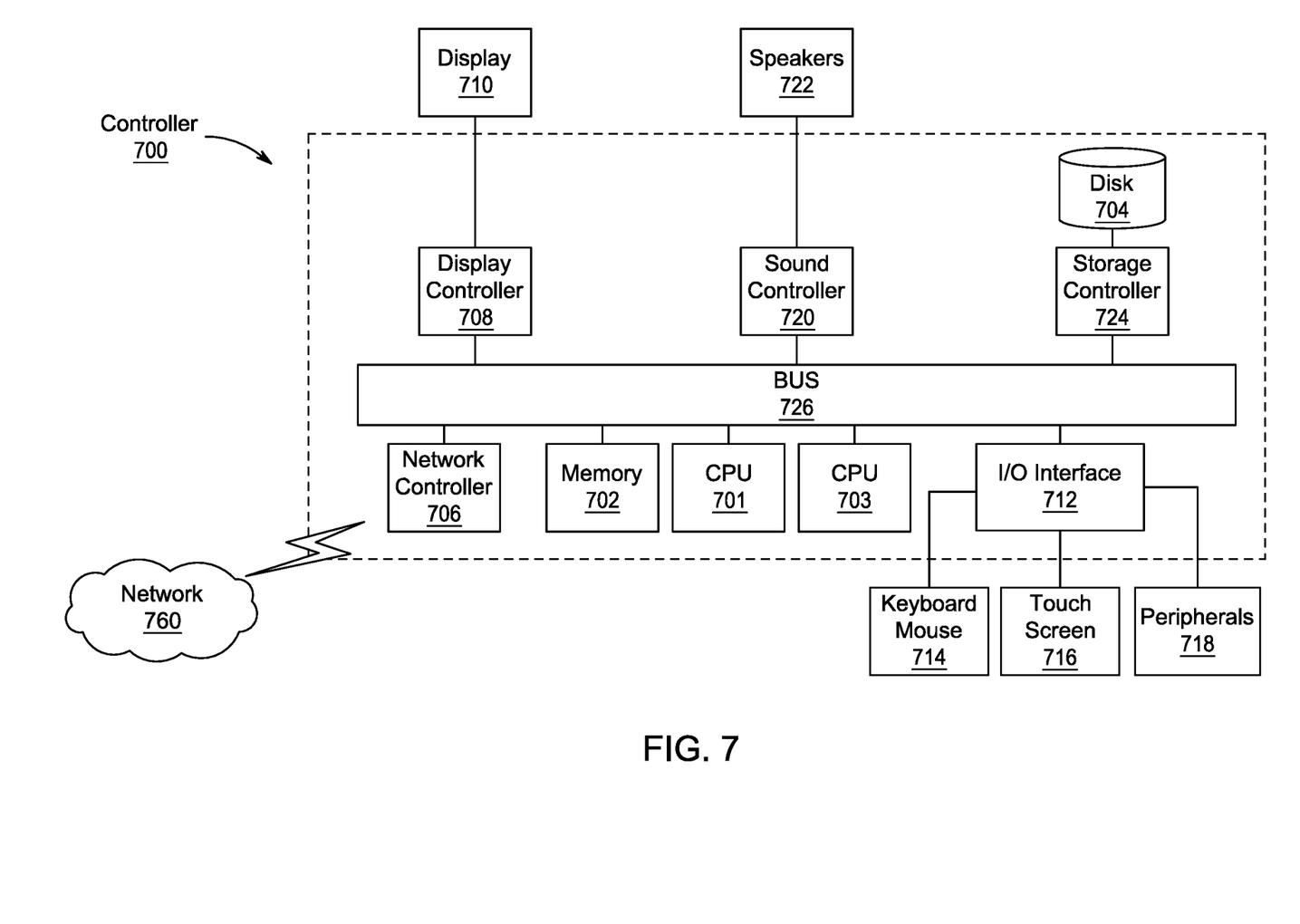
FIG. 7 is an illustration of a non-limiting example of details of computing hardware used in the computing system, according to certain embodiments.

FIG. 7 is an illustration of a non-limiting example of details of computing hardware used in the computing system, according to exemplary aspects of the present disclosure. In FIG. 7, a controller 700 is described, which is a computing device (for example, the base station processor 110) and includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, UNIX, Solaris, LINUX, Apple MAC-OS, and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general-purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
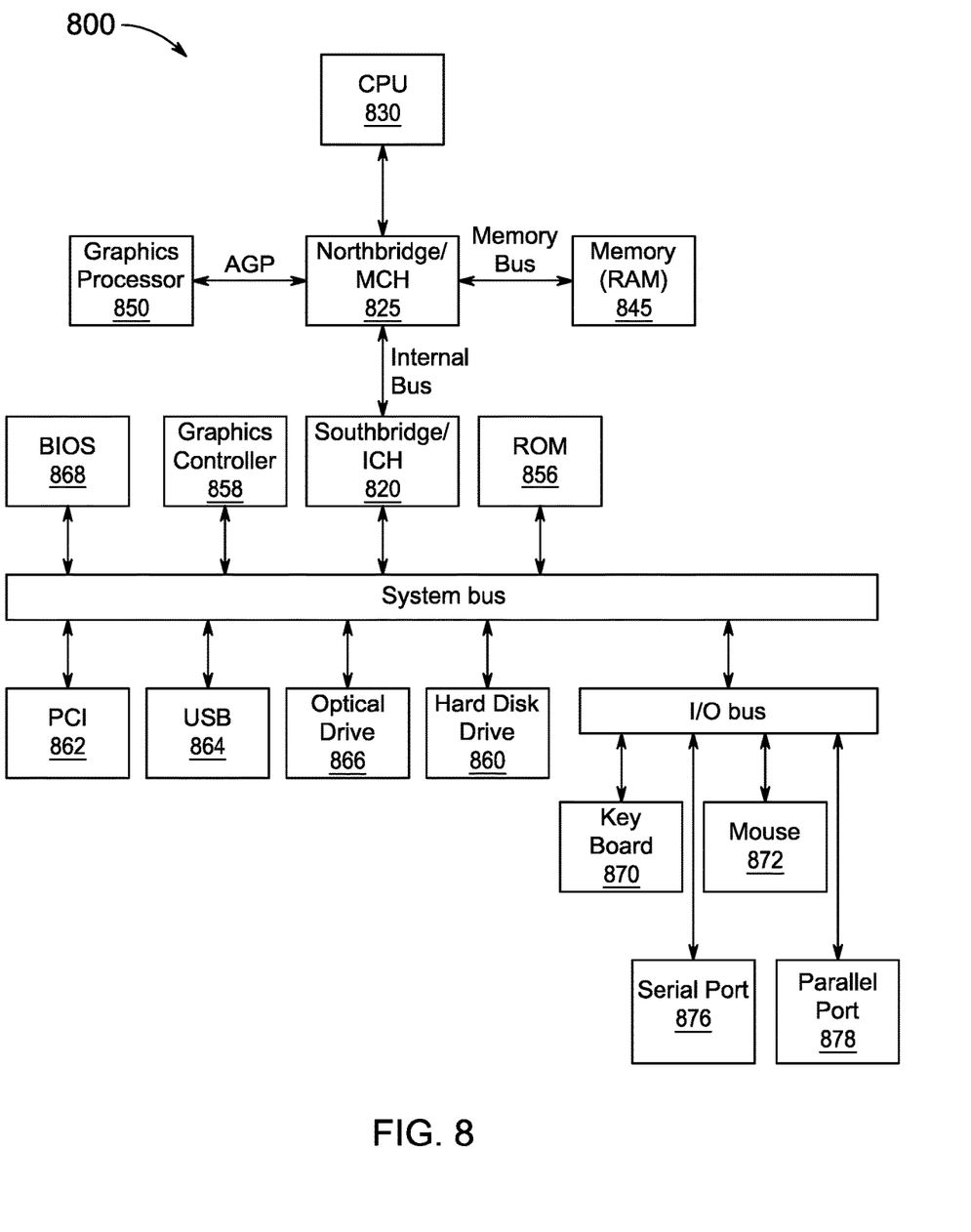
FIG. 8 is an exemplary schematic diagram of a data processing system used within the computing system, according to certain embodiments.

FIG. 8 shows a schematic diagram of a data processing system 800 used within the computing system, according to exemplary aspects of the present disclosure. The data processing system 800 is an example of a computer in which code or instructions implementing the processes of the illustrative aspects of the present disclosure may be located.

In FIG. 8, data processing system 880 employs a hub architecture including a north bridge and memory controller hub (NB/MCH) 825 and a south bridge and input/output (I/O) controller hub (SB/ICH) 820. The central processing unit (CPU) 830 is connected to NB/MCH 1025. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
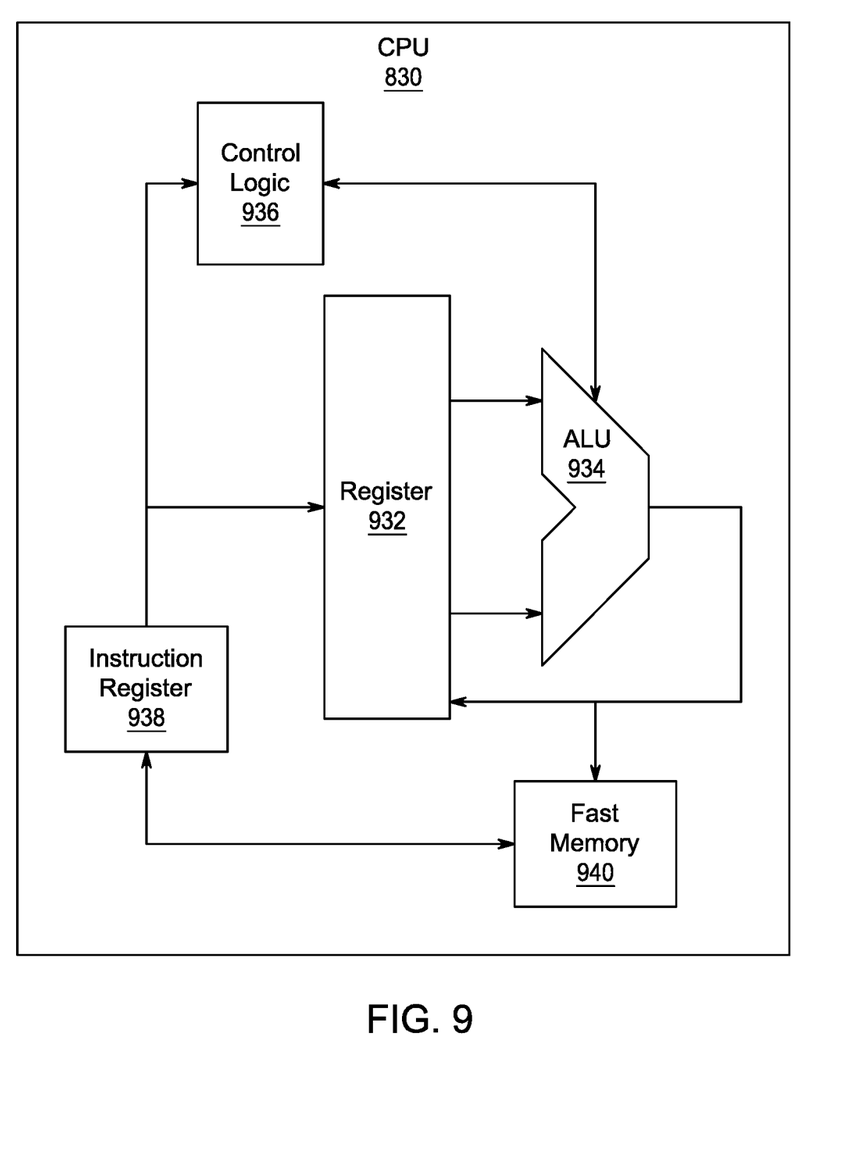
FIG. 9 is an exemplary schematic diagram of a processor used with the computing system, according to certain embodiments.

For example, FIG. 9 shows one aspect of the present disclosure of CPU 830. In one aspect of the present disclosure, the instruction register 938 retrieves instructions from the fast memory 940. At least part of these instructions is fetched from the instruction register 938 by the control logic 936 and interpreted according to the instruction set architecture of the CPU 830. Part of the instructions can also be directed to the register 932. In one aspect of the present disclosure the instructions are decoded according to a hardwired method, and in other aspects of the present disclosure the instructions are decoded according to a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain aspects of the present disclosures, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 880 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 820 through a PCI bus 862.

The PCI devices may include, for example, Ethernet adapters, add-in cards, and PC cards for notebook computers. The Hard disk drive 860 and CD-ROM 856 can use, for example, an integrated drive electronics (IDE) or serial advanced technology attachment (SATA) interface. In one aspect of the present disclosure the I/O bus can include a super I/O (SIO) device.

Further, the hard disk drive (HDD) 860 and optical drive 866 can also be coupled to the SB/ICH 820 through a system bus. In one aspect of the present disclosure, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, an LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
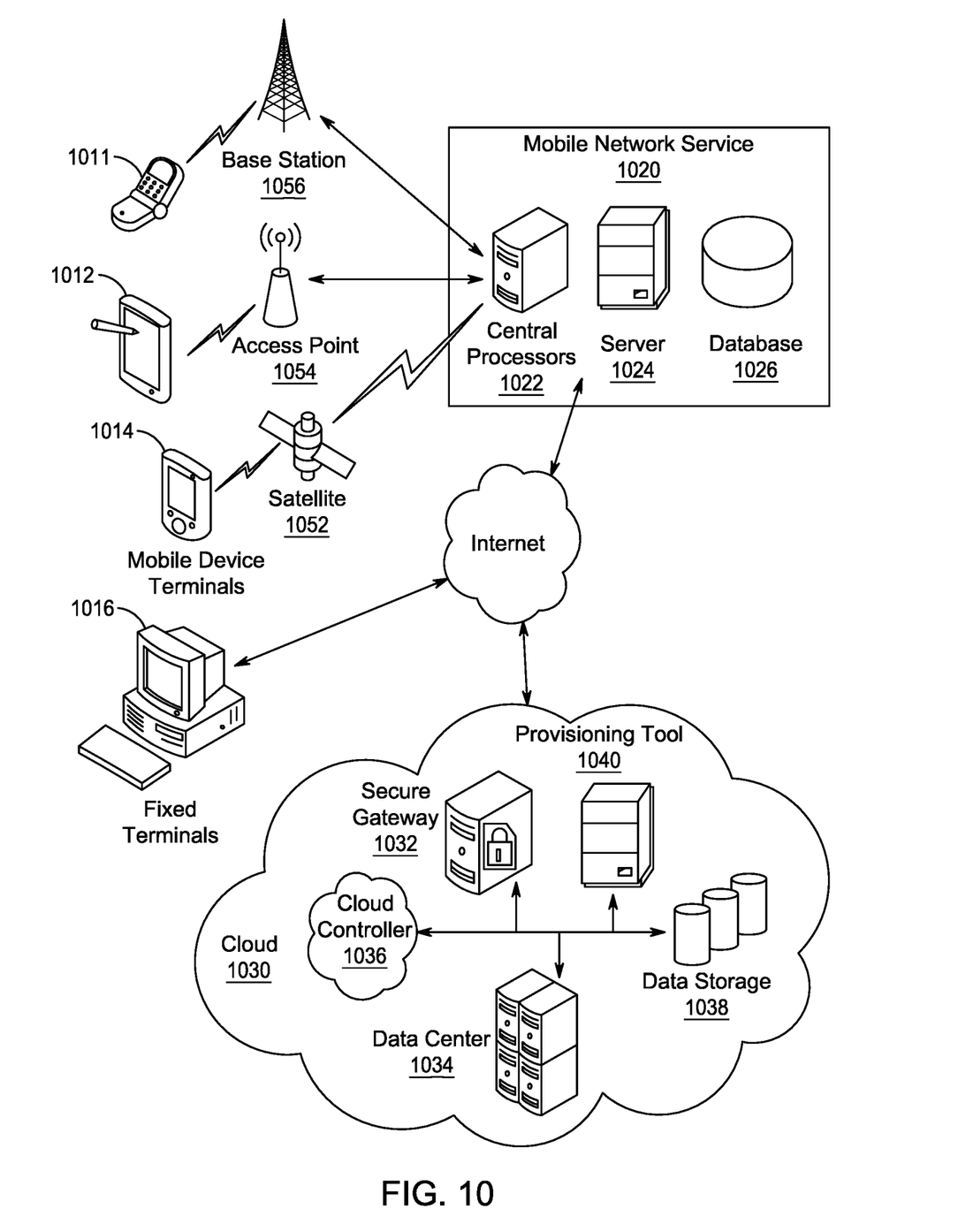
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some aspects of the present disclosures may be performed on modules or hardware not identical to those described. Accordingly, other aspects of the present disclosures are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A method of transmitting data in a power domain non-orthogonal multiple access system, the method comprising:
    generating a first encoded data stream associated with a first user device in response to a first request from the first user device;
    generating a second encoded data stream associated with a second user device in response to a second request from the second user device;
    superimposing the first encoded data stream and the second encoded data stream to generate a superimposed signal;
    estimating a first outage probability value associated with the first user device based on a first signal parameter associated with the first encoded data stream, wherein the first outage probability value satisfies a first acceptable quality of service threshold associated with decoding the first encoded data stream at the first user device;
    estimating a second outage probability value associated with the second user device based on a second signal parameter associated with the second encoded data stream, wherein the second outage probability value satisfies a second acceptable quality of service threshold associated with decoding the second encoded data stream at the second user device;
    determining a first minimum beam power associated with a first beam vector corresponding to the first user device based on the estimated first outage probability value;
    determining a second minimum beam power associated with a second beam vector corresponding to the second user device based on the estimated second outage probability value;
    transmitting the superimposed signal to the first user device at the first minimum beam power; and
    transmitting the superimposed signal to the second user device at the second minimum beam power.

2. The method of claim 1, wherein the first signal parameter is a signal to noise ratio associated with the first encoded data stream.

3. The method of claim 1, wherein the second signal parameter is a signal to interference pulse noise ratio associated with the second encoded data stream.

4. The method of claim 1, wherein the first user device is at a first distance from a base station and the second user device is at a second distance from the base station.

5. The method of claim 4, wherein the second distance is longer than the first distance.

6. The method of claim 4, wherein the first distance is longer than the second distance.

7. The method of claim 1, wherein the first encoded data stream in the superimposed signal is configured to be decoded by the first user device.

8. The method of claim 1, wherein the second encoded data stream in the superimposed signal is configured to be decoded by the second user device.

9. An apparatus for transmitting data in a power domain non-orthogonal multiple access system, the apparatus comprising a memory with programmed instructions stored thereon and one or more processors configured to be capable of executing the stored programmed instructions to:
    generate a first encoded data stream associated with a first user device in response to a first request from the first user device;

generate a second encoded data stream associated with a second user device in response to a second request from the second user device;

superimpose the first encoded data stream and the second encoded data stream to generate a superimposed signal;

estimate a first outage probability value associated with the first user device based on a first signal parameter associated with the first encoded data stream, wherein the first outage probability value satisfies a first acceptable quality of service threshold associated with decoding the first encoded data stream at the first user device;

estimate a second outage probability value associated with the second user device based on a second signal parameter associated with the second encoded data stream, wherein the second outage probability value satisfies a second acceptable quality of service threshold associated with decoding the second encoded data stream at the second user device;

determine a first minimum beam power associated with a first beam vector corresponding to the first user device based on the estimated first outage probability value;

determine a second minimum beam power associated with a second beam vector corresponding to the second user device based on the estimated second outage probability value;

transmit the superimposed signal to the first user device at the first minimum beam power; and transmit the superimposed signal to the second user device at the second minimum beam power.

10. The apparatus of claim 9, wherein the first signal parameter is a signal to noise ratio associated with the first encoded data stream.

11. The apparatus of claim 9, wherein the second signal parameter is a signal to interference pulse noise ratio associated with the second encoded data stream.

12. The apparatus of claim 9, wherein the first user device is at a first distance from a base station and the second user device is at a second distance from the base station.

13. The apparatus of claim 12, wherein the second distance is longer than the first distance.

14. The apparatus of claim 12, wherein the first distance is longer than the second distance.

15. A network management system for transmitting data in a power domain non-orthogonal multiple access system, the network management system comprising:

one or more network nodes, first user devices, or second user devices, and a memory, wherein the memory comprises program instructions stored thereon and one or more processors configured to execute the stored program instructions to:

generate a first encoded data stream associated with a first user device in response to a first request from the first user device;

generate a second encoded data stream associated with a second user device in response to a second request from the second user device;

superimpose the first encoded data stream and the second encoded data stream to generate a superimposed signal;

estimate a first outage probability value associated with the first user device based on a first signal parameter associated with the first encoded data stream, wherein the first outage probability value satisfies a first acceptable quality of service threshold associated with decoding the first encoded data stream at the first user device;

estimate a second outage probability value associated with the second user device based on a second signal parameter associated with the second encoded data stream, wherein the second outage probability value satisfies a second acceptable quality of service threshold associated with decoding the second encoded data stream at the second user device;

determine a first minimum beam power associated with a first beam vector corresponding to the first user device based on the estimated first outage probability value;

determine a second minimum beam power associated with a second beam vector corresponding to the second user device based on the estimated second outage probability value;

transmit the superimposed signal to the first user device at the first minimum beam power; and transmit the superimposed signal to the second user device at the second minimum beam power.

16. The system of claim 15, wherein the first signal parameter is a signal to noise ratio associated with the first encoded data stream.

17. The system of claim 15, wherein the second signal parameter is a signal to interference pulse noise ratio associated with the second encoded data stream.

18. The system of claim 15, wherein the first user device is at a first distance from a base station and the second user device is at a second distance from the base station.

19. The system of claim 18, wherein the second distance is longer than the first distance.

20. The system of claim 18, wherein the first distance is longer than the second distance.

* * * * *